US008843889B2

(12) United States Patent
Anderson et al.

(10) Patent No.: US 8,843,889 B2
(45) Date of Patent: Sep. 23, 2014

(54) MANAGING APPLICATION TEMPLATE ARTIFACTS IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Shaun T. Murakami, San Jose, CA (US); John Reif, Redwood City, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/438,904

(22) Filed: Apr. 4, 2012

(65) Prior Publication Data

US 2013/0268913 A1 Oct. 10, 2013

(51) Int. Cl.
*G06F 9/44* (2006.01)

(52) U.S. Cl.
USPC ............................ 717/120; 717/122; 717/123

(58) Field of Classification Search
None
See application file for complete search history.

(56) References Cited

U.S. PATENT DOCUMENTS

| | | | |
|---|---|---|---|
| 7,509,627 B1 * | 3/2009 | Ayachitula et al. ........... | 717/101 |
| 8,037,453 B1 * | 10/2011 | Zawadzki ..................... | 717/123 |
| 8,132,153 B2 | 3/2012 | Subramanyam | |
| 8,230,393 B2 * | 7/2012 | Bird et al. .................... | 717/120 |
| 8,418,138 B2 * | 4/2013 | Sriramadhesikan et al. . | 717/121 |
| 8,561,023 B2 * | 10/2013 | Abrams et al. ................ | 717/122 |
| 8,645,906 B2 * | 2/2014 | Jain et al. ...................... | 717/122 |
| 8,677,318 B2 * | 3/2014 | Mohindra et al. ............ | 717/120 |
| 8,683,433 B2 * | 3/2014 | Nayak et al. .................. | 717/122 |
| 2004/0143811 A1 * | 7/2004 | Kaelicke et al. .............. | 717/120 |
| 2006/0009990 A1 | 1/2006 | McCormick | |
| 2008/0046433 A1 * | 2/2008 | Kool-Brown et al. ............ | 707/9 |
| 2008/0127089 A1 * | 5/2008 | Peretz et al. .................. | 717/122 |
| 2008/0163171 A1 * | 7/2008 | Chess et al. .................. | 717/120 |
| 2008/0168424 A1 * | 7/2008 | Mohindra et al. ............ | 717/120 |
| 2008/0189324 A1 * | 8/2008 | Keller ....................... | 707/103 R |
| 2008/0270986 A1 * | 10/2008 | Simeonov et al. ............ | 717/120 |

(Continued)

OTHER PUBLICATIONS

Garg, P. and Scacchi, W., A Hypertext System to Manage Software Life-Cycle Documents, [Online] May 1990, IEEE Software, [Retrieved from the Internet] <http://ieeexplore.ieee.org/stamp/stamp.jsp?tp=&arnumber=55233>, pp. 90-98.*

(Continued)

*Primary Examiner* — Thuy Dao
*Assistant Examiner* — Ravi K Sinha
(74) *Attorney, Agent, or Firm* — William E. Schiesser; Keohane & D'Alessandro, PLLC

(57) ABSTRACT

Embodiments of the present invention provide an approach for managing application template artifacts throughout an application's lifecycle in a networked computing environment (e.g., a cloud computing environment). In a typical embodiment, a workload template is assigned to each phase of a set of successive phases of the application's lifecycle. Each template typically refers to a template in a preceding phase of the lifecycle. Moreover, the templates may contain pointers to artifacts used in the phases assigned thereto. Any changes occurring in the artifacts/phases are propagated to the corresponding templates so as to automatically manage application lifecycle operations.

22 Claims, 7 Drawing Sheets

(56) References Cited

U.S. PATENT DOCUMENTS

| | | | |
|---|---|---|---|
| 2008/0300943 A1* | 12/2008 | Simpson et al. | 705/8 |
| 2009/0048894 A1* | 2/2009 | Simpson et al. | 705/9 |
| 2009/0113407 A1* | 4/2009 | Sedukhin et al. | 717/168 |
| 2009/0282065 A1* | 11/2009 | Brimble et al. | 717/123 |
| 2009/0300423 A1 | 12/2009 | Ferris | |
| 2010/0017792 A1 | 1/2010 | Young et al. | |
| 2010/0088150 A1 | 4/2010 | Mazhar et al. | |
| 2010/0115490 A1 | 5/2010 | Wilcock et al. | |
| 2011/0307862 A1* | 12/2011 | Abrams et al. | 717/120 |
| 2011/0314069 A1* | 12/2011 | Alatorre et al. | 707/827 |
| 2012/0072597 A1 | 3/2012 | Teather et al. | |
| 2012/0084752 A1* | 4/2012 | Arnold et al. | 717/121 |
| 2012/0159437 A1* | 6/2012 | Du et al. | 717/120 |
| 2012/0174065 A1* | 7/2012 | Abrams et al. | 717/121 |
| 2012/0297358 A1* | 11/2012 | Kumar et al. | 717/102 |
| 2013/0097585 A1* | 4/2013 | Jentsch et al. | 717/122 |

OTHER PUBLICATIONS

Andrea De Lucia et al., Recovering traceability links in software artifact management systems using information retrieval methods, [Online] Sep. 2007, ACM Trans. Softw. Eng. Methodol. 16, 4, Article 13, [Retrieved from the Internet] <http://delivery.acm.org/10.1145/1280000/1276934/a13-lucia.pdf> total pp. 50.*

Ahrens, J.D. and Prywes, Noah S., Transition to a legacy- and reuse-based software life cycle, [Online] Oct. 1995, [Retrieved from the Internet] <http://ieeexplore.ieee.org/stamp/stamp.jsp?tp=&arnumber=467576> pp. 27-36.*

Mell et al., "The NIST Definition of Cloud Computing", National Institute of Standards and Technology, Information Technology Laboratory, Version 15, Oct. 7, 2009, 2 pages.

Tsai et al., "Internetware Computing: Issues and Perspective", International Journal of Software and Informatics, vol. 3, No. 4, Dec. 2009, 24 pages.

* cited by examiner

MANAGING APPLICATION TEMPLATE ARTIFACTS IN A NETWORKED COMPUTING ENVIRONMENT

TECHNICAL FIELD

Embodiments of the present invention relate generally to application lifecycle management. Specifically, embodiments of the present invention relate to the management of application template artifacts throughout an application lifecycle in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud environments may apply an additional level of complexity as these environments bring together different stages of a software development lifecycle under a management system. Under such a configuration, each stage of the development lifecycle may have an impact on another stage. For example, a function test that generates new information may influence or have an impact on previous and/or future development stages that require a potential update across the lifecycle of the application. Challenges may exist, however, in accurately or efficiently managing such dependencies.

SUMMARY

In general, embodiments of the present invention provide an approach for managing application template artifacts throughout an application's lifecycle in a networked computing environment (e.g., a cloud computing environment). In a typical embodiment, a workload template is assigned to each phase of a set of successive phases of the application's lifecycle. Each template typically refers to a template in a preceding phase of the lifecycle. Moreover, the templates may contain pointers to artifacts used in the phases assigned thereto. Any changes occurring in the artifacts/phases are propagated to the corresponding templates so as to automatically manage application lifecycle operations.

A first aspect of the present invention provides a computer-implemented method for managing application template artifacts in a networked computing environment, comprising: assigning a set of templates to a set of successive phases, the set of successive phases corresponding to a lifecycle of an application, and the set of templates being stored in a computer storage device; providing a reference in at least one template of the set of templates assigned to a particular phase, the reference referring to at least one previous template of the set of templates, and the at least one previous template being assigned to a previous phase in the set of successive phases; provide a set of pointers in the set of templates, the set of pointers referring to a set of artifacts used in the set of successive phases; identifying a set of changes to the set of artifacts, the set of changes occurring between individual phases of the set of successive phases; and propagating the set of changes to the set of templates.

A second aspect of the present invention provides a system for managing application template artifacts in a networked computing environment, comprising: a memory medium comprising instructions; a bus coupled to the memory medium; and a processor coupled to the bus that when executing the instructions causes the system to: assign a set of templates to a set of successive phases, the set of successive phases corresponding to a lifecycle of an application, and the set of templates being stored in a computer storage device; assign a set of templates to a set of successive phases, the set of successive phases corresponding to a lifecycle of an application, and the set of templates being stored in a computer storage device; provide a reference in at least one template of the set of templates assigned to a particular phase, the reference referring to at least one previous template of the set of templates, and the at least one previous template being assigned to a previous phase in the set of successive phases; provide a set of pointers in the set of templates, the set of pointers referring to a set of artifacts used in the set of successive phases; identify a set of changes to the set of artifacts, the set of changes occurring between individual phases of the set of successive phases; and propagate the set of changes to the set of templates.

A third aspect of the present invention provides a computer program product for managing application template artifacts in a networked computing environment, the computer program product comprising a computer readable storage media, and program instructions stored on the computer readable storage media, to: assign a set of templates to a set of successive phases, the set of successive phases corresponding to a lifecycle of an application, and the set of templates being stored in a computer storage device; assign a set of templates to a set of successive phases, the set of successive phases corresponding to a lifecycle of an application, and the set of templates being stored in a computer storage device; provide a reference in at least one template of the set of templates assigned to a particular phase, the reference referring to at least one previous template of the set of templates, and the at least one previous template being assigned to a previous phase in the set of successive phases; provide a set of pointers in the set of templates, the set of pointers referring to a set of artifacts used in the set of successive phases; identify a set of changes to the set of artifacts, the set of changes occurring between individual phases of the set of successive phases; and propagate the set of changes to the set of templates.

A fourth aspect of the present invention provides a method for deploying a system for managing application template artifacts in a networked computing environment, comprising: providing a computer infrastructure being operable to: assign a set of templates to a set of successive phases, the set of successive phases corresponding to a lifecycle of an application, and the set of templates being stored in a computer storage device; assign a set of templates to a set of successive phases, the set of successive phases corresponding to a lifecycle of an application, and the set of templates being stored in a computer storage device; provide a reference in at least one template of the set of templates assigned to a particular phase, the reference referring to at least one previous template of the set of templates, and the at least one previous template being assigned to a previous phase in the set of successive phases; provide a set of pointers in the set of templates, the set of pointers referring to a set of artifacts used in the set of successive phases; identify a set of changes to the set of artifacts, the set of changes occurring between individual phases of the set of successive phases; and propagate the set of changes to the set of templates.

BRIEF DESCRIPTION OF THE DRAWINGS

These and other features of this invention will be more readily understood from the following detailed description of the various aspects of the invention taken in conjunction with the accompanying drawings in which.

Figure 1:
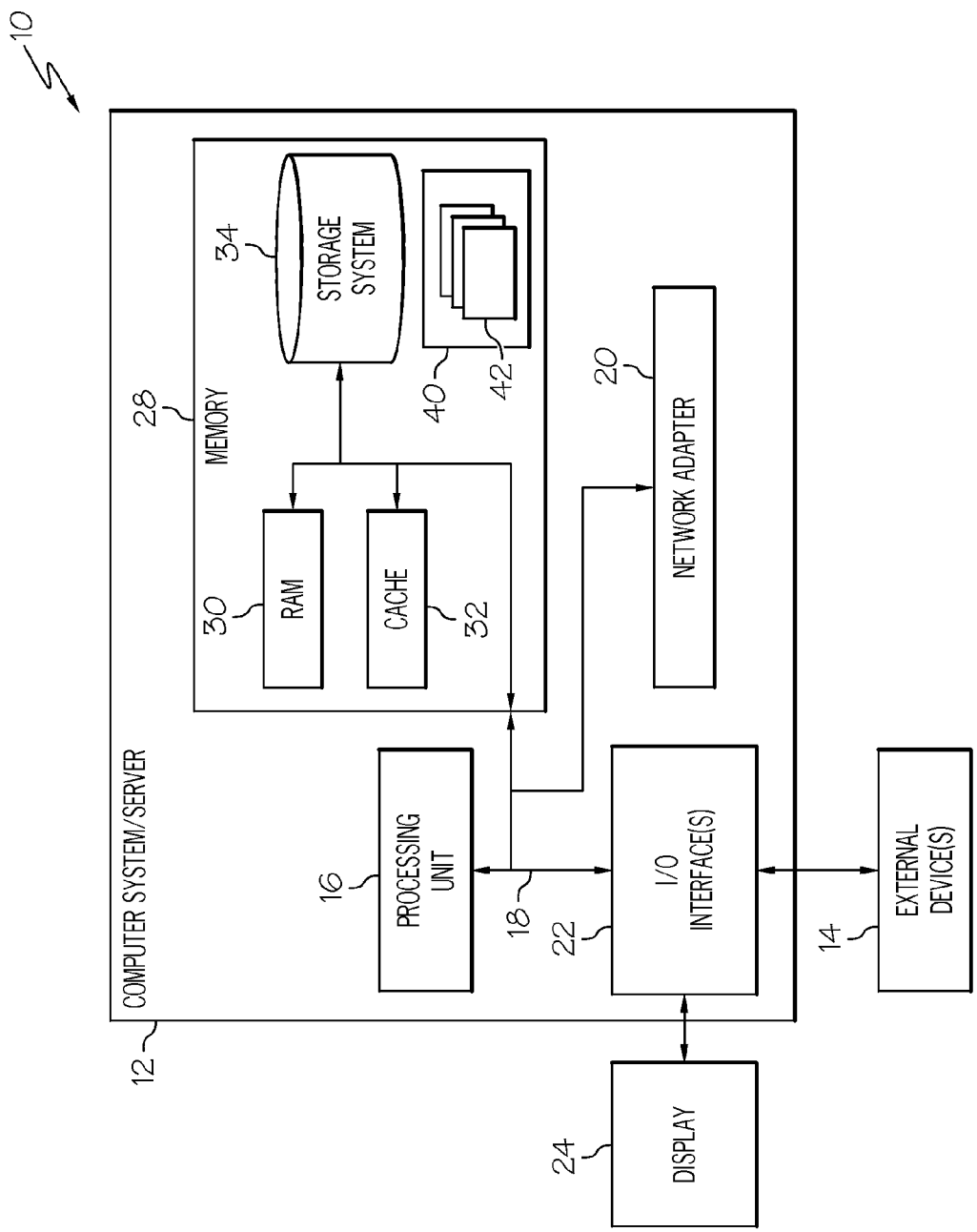
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for managing application template artifacts throughout an application's lifecycle in a networked computing environment (e.g., a cloud computing environment). In a typical embodiment, a workload template is assigned to each phase of a set of successive phases of the application's lifecycle. Each template typically refers to a template in a preceding phase of the lifecycle. Moreover, the templates may contain pointers to artifacts used in the phases assigned thereto. Any changes occurring in the artifacts/phases are propagated to the corresponding templates so as to automatically manage application lifecycle operations.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
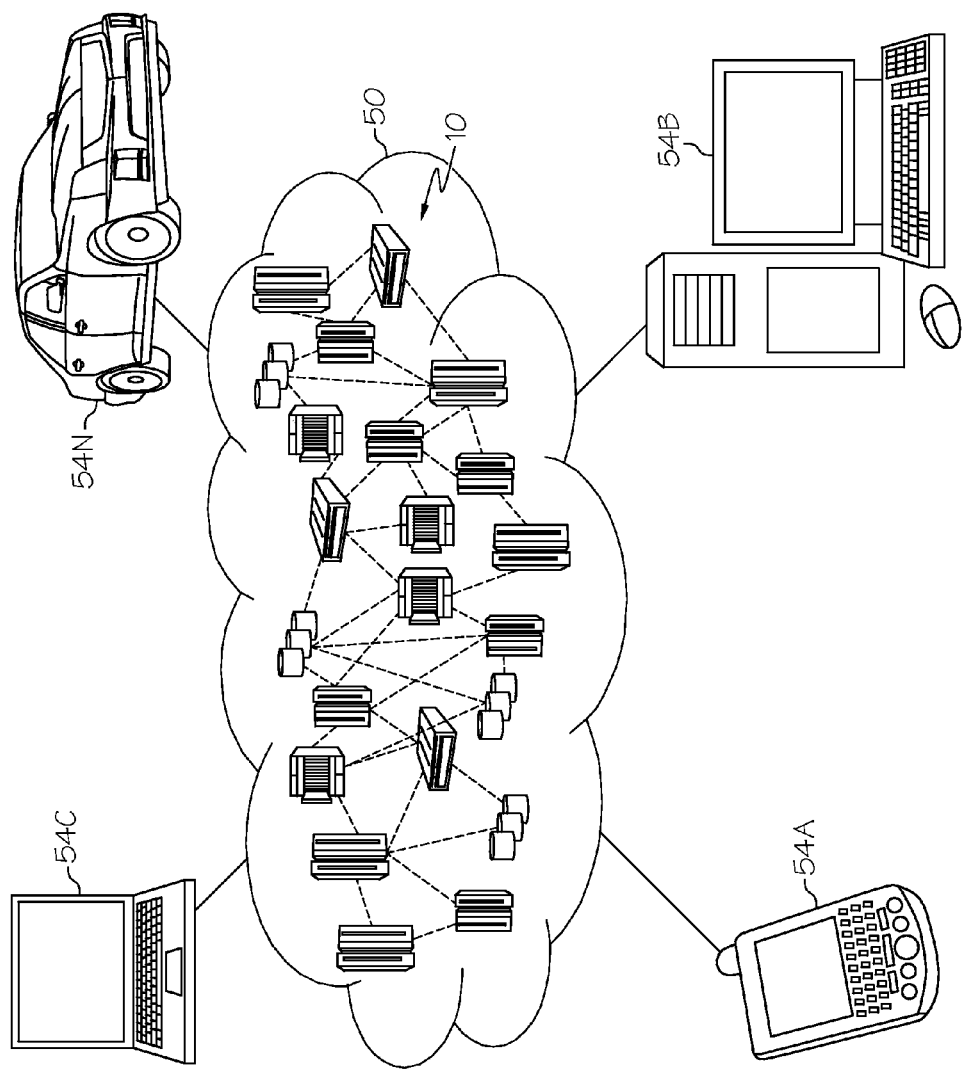
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
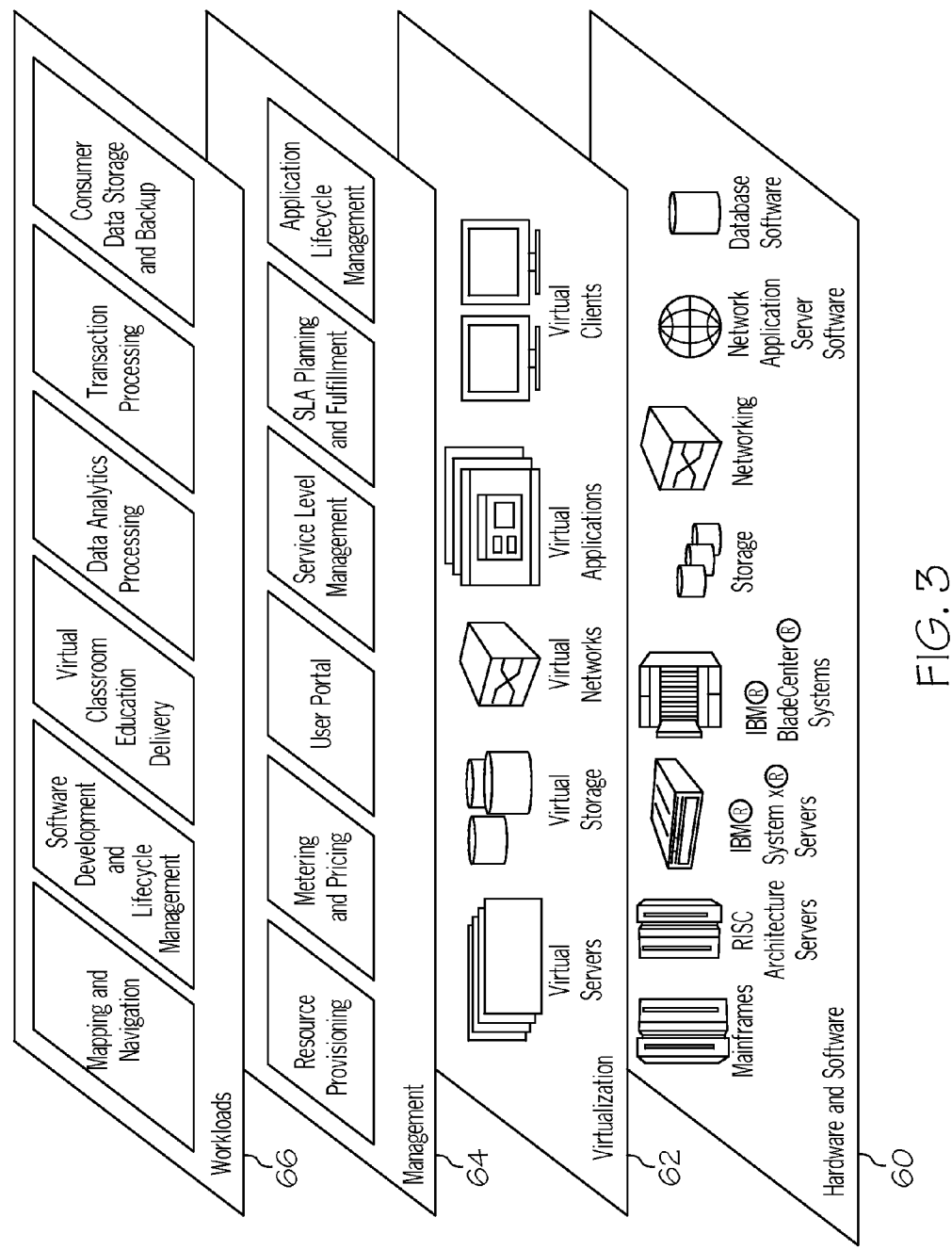
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is application lifecycle management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the application lifecycle management functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
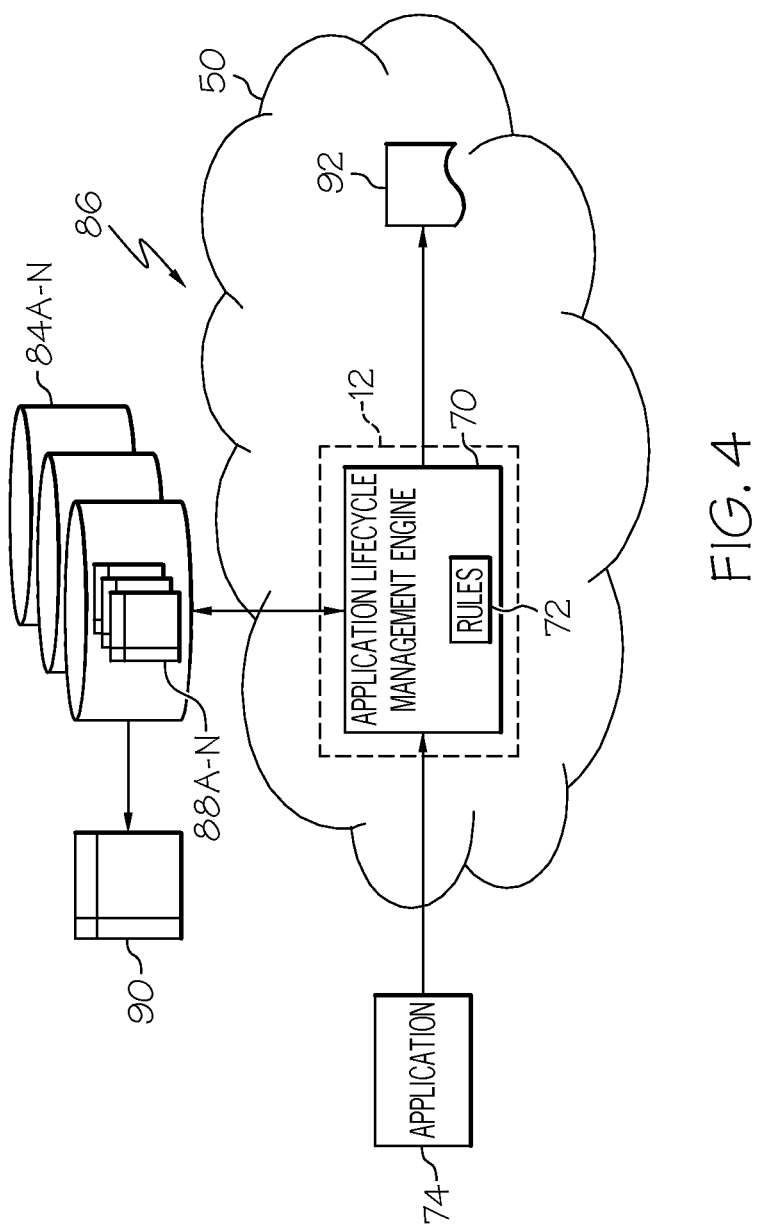
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a network computer system is shown in FIG. 4. In the event the teachings recited herein are practiced in a networked computing environment 86, each client need not have an application lifecycle management engine (engine 70). Rather, engine 70 could be loaded on a server or server-capable device that communicates (e.g., wirelessly) with the clients to provide application lifecycle management therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides application lifecycle management hereunder.

Along these lines, engine 70 may perform multiple functions similar to a general-purpose computer. Specifically, among other functions, engine 70 may (among other things): assign a set of templates 88A-N to a set of successive phases/stages (e.g., a requirement phase, a design phase, a development phase, a test phase, a production phase, etc.), the set of successive phases corresponding to a lifecycle of an application 74, and the set of templates 88A-N being stored in a computer storage device 84A-N; provide a reference in at least one template 90 of the set of templates 88A-N assigned to a particular phase, the reference referring to at least one previous template of the set of templates 88A-N, and the at least one previous template being assigned to a previous phase in the set of successive phases; provide a set of pointers in the set of templates, the set of pointers referring to a set of artifacts (e.g., application requirements, application tasks, application source codes, application test cases, application defects, application builds, application compliance requirements, etc.) used in the set of successive phases; identify a set of changes to the set of artifacts, the set of changes occurring between individual phases of the set of successive phases; propagate the set of changes to the set of templates; generate a subsequent version of each of the set of templates to which the set of changes apply; and/or generate a notification 92 corresponding to at least one of the set of changes.

Illustrative Embodiment

The following section describes an illustrative example according to one embodiment of the present invention. It is understood that other embodiments/examples may be incorporated/accommodated within the teachings recited herein. In any event, the embodiments of the present invention manage cloud application template artifacts throughout an application's lifecycle through the use of cloud workload templates. Embodiments of the present invention further provide for validation of requirements throughout a cloud development lifecycle, as well as a mechanism to correct/update requirements as needed. In general, each phase of the lifecycle of an application is assigned a workload template with each template having a substantially similar data structure model. Assume in this example that there are phases and assigned templates in a cycle of lifecycle of a particular application as follows:

| Lifecycle Phases | Associated Templates |
| --- | --- |
| Requirement | ReqTemp |
| Design | ArchTemp |
| Development | DevTemp |
| Test | TestTemp |
| Production | DeplTemp |

Under the teachings recited herein, changes to the phases (e.g., the artifacts corresponding thereto) are propagated to the assigned templates. Embodiments of the present invention provide for both horizontal propagation (propagation between templates within a single cycle of a lifecycle) as well as vertical propagation (e.g., propagation between templates in successive cycles).

Horizontal Propagation

Figure 5:
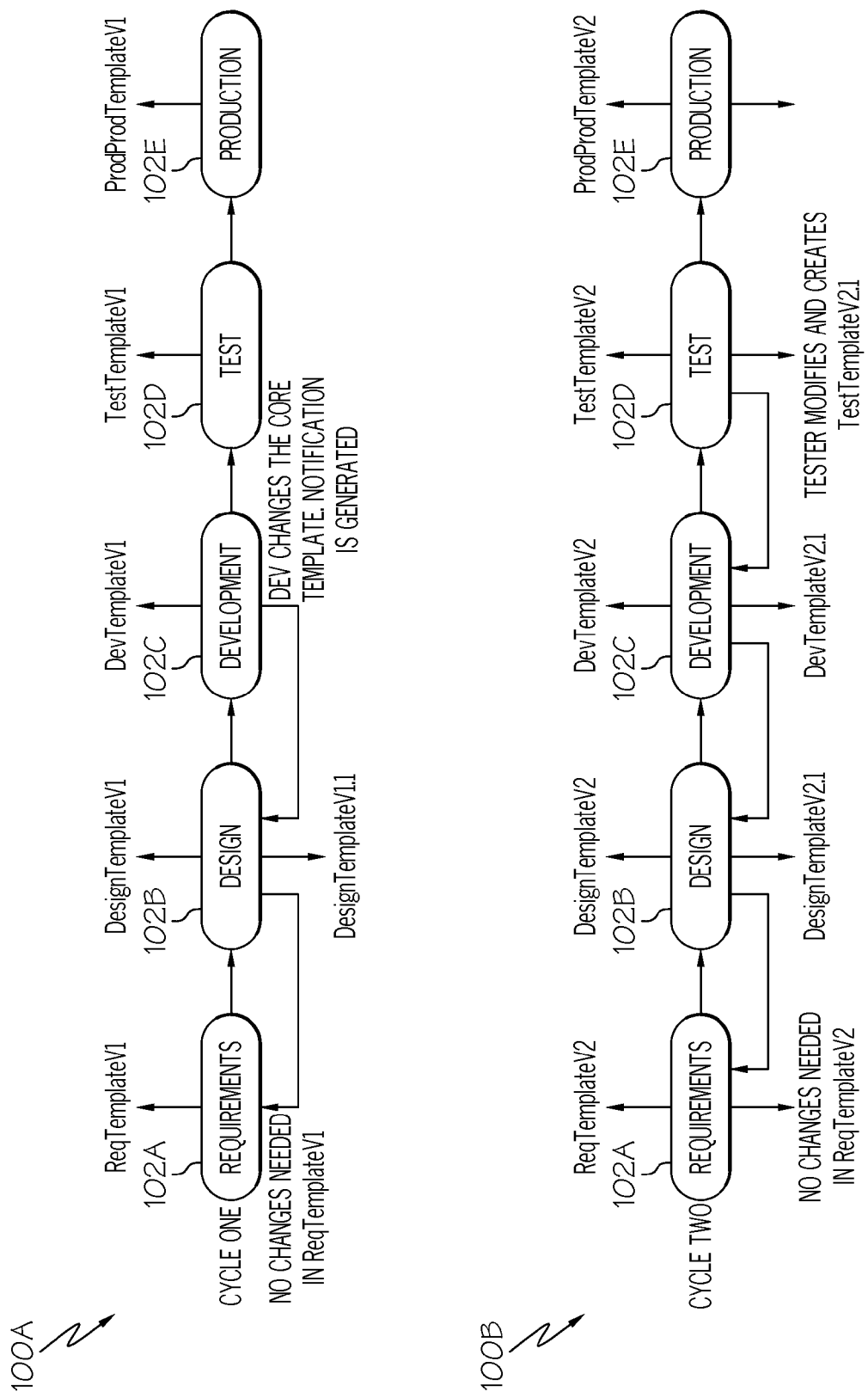
FIG. 5 depicts illustrative examples of horizontal change propagation according to an embodiment of the present invention.

This approach manages and tracks changes in one particular cycle horizontally. Referring to FIG. 5, an example of horizontal propagation is shown. As depicted, FIG. 5 comprises cycles 100A-B, each having phases 102A-E with pointers (shown as arrows in FIG. 5) to particular templates assigned thereto. Under this embodiment, changes are propagated between templates on an intra-cycle basis. In general, cycle 102B represents a further refinement from cycle 102A of a corresponding application.

As shown in cycle 100A, changes are propagated from: development phase 102C to design phase 102B, and from design phase 102B to requirements phase 102A. As further depicted, the changes resulted in an update from DesignTemplate V1 to DesignTemplate V1.1. However, no changes were needed for the ReqTemplate V1. As shown in cycle 100B, changes are propagated from: test phase 102D to development phase 102C, development phase 102C to design phase 102B, from design phase 102B to requirements phase 102A. This series of propagations results in updates to the templates for the: test phase 102D (from TestTemplate V2 to TestTemplate V2.1), development phase 102C (DevTemplate V2 to DevTemplate V2.1), and design phase 102B (DesignTemplate V2 to DesignTemplate V2.1). However, no changes are needed to the template for requirements phase 102A (e.g., ReqTenmplate V2 remained ReqTemplate V2).

Additional details and illustrative output of cycles 100A-B are as follows:

Cycle 100A:
1) As part of a requirements gathering process, a "cloud platform-as-a-service" workload template may be generated by either of the two methods below:
   a) Analysis of previous requirement documents and templates, if they exist, so as to determine requirements for the current development project.
   b) Or a new template component is created by a requirements engineer or the like.
   Output—ReqTemplate V1
2) A system architect then refers to the ReqTemplate and creates a next level of the instantiated template. The architect then assigns different products and software to be used within the template.
   Output—ArchTemplate V1
3) The developer then refers to an ArchTemplate (not shown) and makes changes by adding one or more components needed to develop the application, as well as associating the details of source control and team tracking within the template. Since the developer has modified/changed the template for the missing component, the original referred to as ArchTemplate is modified and a notification is generated for the architect(s) of the change made. The system also detects for any templates in subsequent phase(s) (e.g., test phase), to which should be notified should be made of the changes. Since no TestTemplate exists, no changes and notifications are propagated. Output—DevTemplate V1 with Development related artifacts ArchTemplate V1 is modified and new version is created—ArchTemplateV1.1
4) A tester refers the DevTemplate to assign test policies.
   Output—TestTemplate V1
5) A deployment manager creates DeplTemplate. Certain policies (compliance, etc.) may need to be changed based on the environment.
   Output—DeplTemp V1

Cycle 100B:
In the second cycle, the tester may use a new version of a database to deploy and test the database. Once the database passes the test, the TestTemplate V2 may modified with a new version of the database.

Output—TestTemp V2.1

A notification may be generated for:
  a) Production deployer(s) that determine that a test database has changed.
  b) Developer(s) who then modify DevTemplate V2.

Output—DevTemplate V2.1
  c) DevTemp2.1 generation in turn leads a notification for Architects(s) who modify ArchTemp V2.

Output—ArchTemp V2.1

Vertical Propagation

Figure 6:
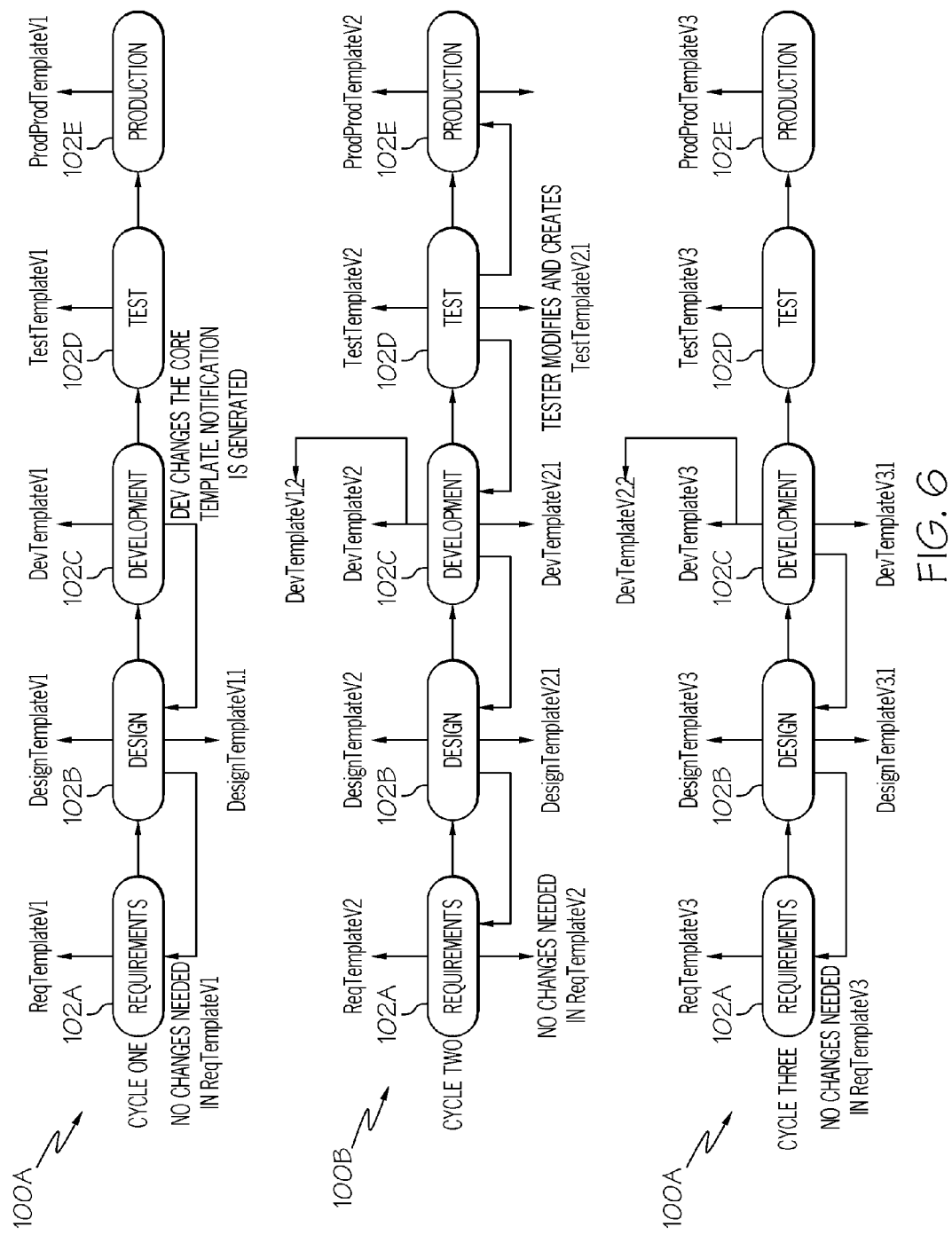
FIG. 6 depicts illustrative examples of vertical change propagation according to an embodiment of the present invention.

This approach manages and tracks changes across multiple cycles (i.e., vertically). An example of this is shown in FIG. 6. As depicted, FIG. 6 shows cycles 100A-C having phases 102A-E. Cycles 100A-B function internally as described above. So, these details need not be repeated herein. As further shown in FIG. 6, in cycle 100C, changes are propagated from: development phase 102B to design phase 102B, and from design phase 102B to requirements phase 102A. This series of propagations results in updates to the templates for the: development phase 102D (DevTemplate V3 to DevTemplate V3.1), design phase 102B (DesignTemplate V3 to DesignTemplate V3.1). However, no changes are needed to the template for requirements phase 102A (e.g., ReqTemplate V3 remains ReqTemplate V3). As further shown, changes may be propagated on an inter-cycle level. For example, changes are propagated for development phase 102C between cycles 100C.

Additional details and illustrative output of cycle 100C are as follows:

Cycle 100C

In the cycle 100C, a developer may utilize a new implementation for a set of application programming interfaces (APIs)), pointing to a different provider by modifying a workload template to point to a different provider. This may cause an error/defect that is logged in cycles 102A-B.

Output—DevTempV3.0

Apart from a horizontal notification, this embodiment may generate a notification for DevTemplate V2.1, which in turn generates horizontal and vertical notification for DevTemplate V1.0, so that the error/defect may be corrected and a patch or the like may be released.

Output—DevTemp V2.2, DevTemp V1.1, etc.

This embodiment could also have a broadcast to all "N" nodes instead of just neighboring/successive nodes. This may be implementing using the following function:

If there are N phases in a lifecycle, and a modification happens in phase X ($0=<X<=N$)
  1) A notification is generated for immediate neighbors if they exist (e.g., X−1 and X+1), and only if acceptance is made the receiving node(s), the change is propagated to other neighbors (X-1 propagates to X+1).
  2) A notification is generated for all the phases in the lifecycle (for all the N nodes).

Figure 7:
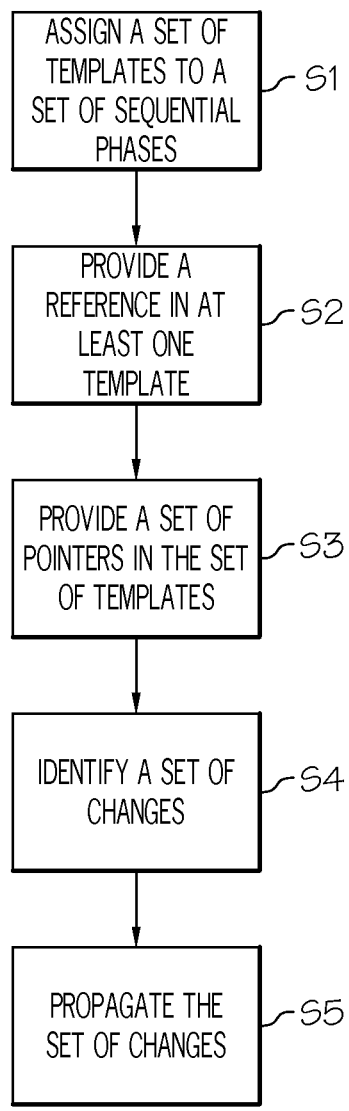
FIG. 7 depicts a method flow diagram according to an embodiment of the present invention.

Referring now to FIG. 7, a method flow diagram according to an embodiment of the present invention is shown. In step S1, a set of templates is assigned to a set of successive phases. As indicated above, the set of successive phases correspond to a lifecycle of an application, and the set of templates may be stored in a computer storage device. In step S2, a reference is provided in at least one template of the set of templates assigned to a particular phase. The reference typically refer to at least one previous template of the set of templates, while the at least one previous template may be assigned to a previous phase in the set of successive phases. In step S3, a set of pointers is provided in the set of templates. The set of pointers typically refer to a set of artifacts used in the set of successive phases. In step S4, a set of changes to the set of artifacts is identified. The set of changes typically occur between individual phases of the set of successive phases. In step S5, the set of changes is propagated to the set of templates.

While shown and described herein as an application lifecycle management solution, it is understood that the invention further provides various alternative embodiments. For example, in one embodiment, the invention provides a computer-readable/useable medium that includes computer program code to enable a computer infrastructure to provide application lifecycle management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide application lifecycle management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for application lifecycle management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for managing application template artifacts in a networked computing environment, comprising:
    assigning a set of templates to a set of successive phases, each of the set of templates being assigned to a single one of the set of successive phases, the set of successive phases corresponding to a lifecycle of an application, and the set of templates being stored in a computer storage device;
    providing a reference in at least one template of the set of templates assigned to a particular phase, the reference referring to at least one previous template of the set of templates, and the at least one previous template being assigned to a previous phase in the set of successive phases;
    providing a set of pointers in the set of templates, the set of pointers referring to a set of artifacts used in the set of successive phases;
    identifying a set of changes to the set of artifacts, the set of changes occurring between individual phases of the set of successive phases; and
    propagating the set of changes to the at least one previous template of the set of templates via the reference.

2. The computer-implemented method of claim 1, the particular phase immediately following the previous phase in the set of successive phases.

3. The computer-implemented method of claim 1, the set of artifacts comprising at least one of the following: application requirements, application tasks, application source codes, application test cases, application defects, application builds, or application compliance requirements.

4. The computer-implemented method of claim 1, the set of phases comprising at least one of the following a requirement phase, a design phase, a development phase, a test phase, or a production phase.

5. The computer-implemented method of claim 1, the propagating comprising generating a subsequent version of each of the set of templates to which the set of changes apply.

6. The computer-implemented method of claim 1, further comprising generating a notification corresponding to at least one of the set of changes.

7. The computer-implemented method of claim 1, the networked computing environment comprising a cloud computing environment.

8. A system for managing application template artifacts in a networked computing environment, comprising:
    a memory medium comprising instructions;
    a bus coupled to the memory medium; and
    a processor coupled to the bus that when executing the instructions causes the system to:
        assign a set of templates to a set of successive phases, each of the set of templates being assigned to a single one of the set of successive phases, the set of successive phases corresponding to a lifecycle of an application, and the set of templates being stored in a computer storage device;
        provide a reference in at least one template of the set of templates assigned to a particular phase, the reference referring to at least one previous template of the set of templates, and the at least one previous template being assigned to a previous phase in the set of successive phases;
        provide a set of pointers in the set of templates, the set of pointers referring to a set of artifacts used in the set of successive phases;
        identify a set of changes to the set of artifacts, the set of changes occurring between individual phases of the set of successive phases; and
        propagate the set of changes to the at least one previous template of the set of templates via the reference.

9. The system of claim 8, the particular phase immediately following the previous phase in the set of successive phases.

10. The system of claim 8, the set of artifacts comprising at least one of the following: application requirements, application tasks, application source codes, application test cases, application defects, application builds, or application compliance requirements.

11. The system of claim 8, the set of phases comprising at least one of the following: a requirement phase, a design phase, a development phase, a test phase, or a production phase.

12. The system of claim 8, the memory medium further comprising instructions for causing the system to generate a subsequent version of each of the set of templates to which the set of changes apply.

13. The system of claim 8, the memory medium further comprising instructions for causing the system to generate a notification corresponding to at least one of the set of changes.

14. The system of claim 8, the networked computing environment comprising a cloud computing environment.

15. A computer program product for managing application template artifacts in a networked computing environment, the computer program product comprising a computer readable storage memory, and program instructions stored on the computer readable storage memory, to:
    assign a set of templates to a set of successive phases, each of the set of templates being assigned to a single one of the set of successive phases, the set of successive phases corresponding to a lifecycle of an application, and the set of templates being stored in a computer storage device;
    provide a reference in at least one template of the set of templates assigned to a particular phase, the reference referring to at least one previous template of the set of templates, and the at least one previous template being assigned to a previous phase in the set of successive phases;

provide a set of pointers in the set of templates, the set of pointers referring to a set of artifacts used in the set of successive phases;

identify a set of changes to the set of artifacts, the set of changes occurring between individual phases of the set of successive phases; and propagate the set of changes to the at least one previous template of the set of templates via the reference.

16. The computer program product claim 15, the particular phase immediately following the previous phase in the set of successive phases.

17. The computer program product claim 15, the set of artifacts comprising at least one of the following: application requirements, application tasks, application source codes, application test cases, application defects, application builds, or application compliance requirements.

18. The computer program product claim 15, the set of phases comprising at least one of the following: a requirement phase, a design phase, a development phase, a test phase, or a production phase.

19. The computer program product claim 15, the computer readable storage media further comprising instructions to generate a subsequent version of each of the set of templates to which the set of changes apply.

20. The computer program product claim 15, the computer readable storage media further comprising instructions to generate a notification corresponding to at least one of the set of changes.

21. The computer program product claim 15, the networked computing environment comprising a cloud computing environment.

22. A computer-implemented method for deploying a system for managing application template artifacts in a networked computing environment, comprising:

providing a computer infrastructure being operable to:

assign a set of templates to a set of successive phases, each of the set of templates being assigned to a single one of the set of successive phases, the set of successive phases corresponding to a lifecycle of an application, and the set of templates being stored in a computer storage device;

provide a reference in at least one template of the set of templates assigned to a particular phase, the reference referring to at least one previous template of the set of templates, and the at least one previous template being assigned to a previous phase in the set of successive phases;

provide a set of pointers in the set of templates, the set of pointers referring to a set of artifacts used in the set of successive phases;

identify a set of changes to the set of artifacts, the set of changes occurring between individual phases of the set of successive phases; and propagate the set of changes to the at least one previous template of the set of templates via the reference.

\* \* \* \* \*